United States Patent [19]

Bikson et al.

[11] Patent Number: 5,071,552
[45] Date of Patent: Dec. 10, 1991

[54] MULTIPLE BUNDLE FLUID SEPARATION APPARATUS

[75] Inventors: Benjamin Bikson, Brookline; Salvatore Giglia, Norwood, both of Mass.

[73] Assignee: Union Carbide Industrial Gases Technology Corporation, Danbury, Conn.

[21] Appl. No.: 630,894

[22] Filed: Dec. 20, 1990

[51] Int. Cl.$^5$ .............................................. B01D 63/04
[52] U.S. Cl. ............................ 210/321.8; 210/321.89; 210/500.23
[58] Field of Search ........... 210/321.6, 321.72, 321.78, 210/321.79, 321.8, 321.87, 321.88, 321.89, 500.23

[56] References Cited

U.S. PATENT DOCUMENTS

| | | | |
|---|---|---|---|
| 3,722,694 | 3/1973 | Agranat | 210/321 |
| 4,061,574 | 12/1977 | Clark | 210/321 R |
| 4,187,180 | 2/1980 | Joh | 210/321 R |
| 4,289,623 | 9/1981 | Lee | 210/247 |
| 4,293,419 | 10/1981 | Sekino et al. | 210/321.1 |
| 4,451,369 | 5/1984 | Sekino et al. | 210/321.1 |
| 4,632,756 | 12/1986 | Coplan et al. | 210/323.2 |
| 4,652,373 | 3/1987 | Trimmer | 210/321.1 |
| 4,670,145 | 6/1987 | Edwards | 210/321.1 |
| 4,865,736 | 9/1989 | Coplan | 210/321.79 |

FOREIGN PATENT DOCUMENTS

0201320 11/1986 European Pat. Off. .
291605 11/1988 Japan .

*Primary Examiner*—Frank Sever
*Attorney, Agent, or Firm*—Alvin H. Fritschler

[57] ABSTRACT

Multiple bundle fluid separation apparatus having at least two hollow fiber membrane bundles arranged in end-to-end linear series encased in a shell or casing. The bundles are in communication with a core tube and are connected serially in such fashion that one end of one bundle is connected to one end of its adjacent bundle. There is also present an auxiliary permeate tube to convey permeate to a permeate exit port. The casing has appropriate ports for feed inlet, and retentate and permeate outlets.

16 Claims, 10 Drawing Sheets

MULTIPLE BUNDLE FLUID SEPARATION APPARATUS

FIELD OF THE INVENTION

The present invention pertains to a multiple bundle fluid separation apparatus or module for separating a first component of a mixture of fluids from at least one other component of the mixture. The apparatus contains at least two bundles of hollow fiber membranes arranged uniaxially in series in end-to-end or end-to-cap configuration, e.g., tubesheet-to-end cap, tubesheet-to-tubesheet and end cap-to-end cap. The apparatus is comprised of a casing and interior assembly of annular hollow fiber bundles.

BACKGROUND OF THE INVENTION

The use of membranes to effect separation of gas/gas mixtures and liquid/liquid mixtures has achieved general industrial applicability for various methods, such as ultrafiltration, reverse osmosis, and gas separation. Recently, attention has been particularly given to gas separation which is effective in the separation of such mixtures as oxygen/nitrogen, carbon dioxide/methane, and hydrogen/methane to name a few.

The hollow fiber membrane configuration is currently the most common membrane configuration in gas separations with processes generally carried out at elevated pressures from about 100 up to about 2,000 psi and temperatures ranging from room temperature up to about 100° C.

Hollow fiber membrane fluid separation apparatus for the separation of a first component from at least one other component in a mixture of fluids that can be comprised of liquids or gases has numerous embodiments in the art. The most frequent configuration involves the use of a single bundle of hollow fiber membranes confined within a shell to form the module. The module, e.g., the container with the membrane element, is arranged to provide for the introduction of a feed stream, the means of collecting permeate that passes through the membranes, and the means for collecting nonpermeate/ retentate. The modules are so arranged as to prevent intermixing between the streams In some instances a plurality of modules are then connected via manifold means to feed inlet means and permeate exit means and retentate exit means Modifications further exist in which multiple bundles are contained in a single shell as discussed below.

In U.S. Pat. No. 3,722,694, issued Mar. 27, 1973 to E. A. Agranat, there is disclosed a filtration device in which the filter cartridges are arranged parallel to one another in an enclosure. The device is particularly applicable to ultrafiltration separations.

U.S. Pat. No. 4,187,180, issued Feb. 5, 1980 to Yasushi Joh, discloses another hollow fiber permeability apparatus wherein the hollow fiber cartridges are arranged in parallel relationship to one another in an enclosure and in which the enclosure includes inwardly formed constrictions around the longitudinal direction of the hollow fiber bundles arranged in parallel configuration.

U.S. Pat. No. 4,289,623, issued Sept. 15, 1981 to K. H. Lee, discloses a dialyzer construction having elongated tubular casing and a plurality of chambers so arranged in parallel relationship to each other that dialyzate flows from one casing end to the other through one of the passages around the hollow fibers and so to and from lengthwise through the other passages and finally out of the casing.

In the three references described above, the hollow fiber bundles are arranged in a configuration in which the sides of the bundles are in parallel alignment with one another and the enclosure or casing. The bundles are not in end-to-end alignment within an elongated cylindrical casing or shell.

U.S. Pat. N. 4,632,756, issued Dec. 30, 1986 to M. J. Coplan, et al., discloses a module composed of a single cylindrical shell having several fiber bundles extending in parallel relation to the shell. The arrangement disclosed in Coplan, et al., which configuration provides for relatively low packing density of the membrane area in a given shell volume, differs significantly from that of the invention described in this specification as will be seen hereinafter. In this reference the bundles are not all arranged in end-to-end serial alignment within a single elongated casing or shell.

U.S. Pat. No. 4,293,419, issued Oct. 6, 1981 to M. Sekino, et al., describes an apparatus based on a cylindrical pressure container divided into two longitudinal compartments by a dividing member at the substantial longitudinal center portion. In each compartment there is a hollow fiber assembly. In operation, the fluid to be treated is initially contacted with the exterior of one of the hollow fiber assemblies, the permeate is recovered and the retentate is passed into the second compartment and comes into contact with the exterior of the second hollow fiber assembly Permeate is recovered from the second assembly and final retentate is discharged. The apparatus disclosed by Sekino, et al. differs considerably from that of the instant specification since it provides for sequential contact of retentate from a first assembly to a second assembly. This is also true when a plurality of dual assemblies is employed in the construction shown in FIG. 6 of U.S. Pat. No. 4,293,419.

U.S. Pat. No. 4,451,369, issued May 29, 1984 to M. Sekino, et al., discloses a cylindrical multiple bundle permeator with bundles usually arranged in pairs having a common annular space filled with a collecting means connected to the adjacent tube sheets. Permeate flows through a dual passage connector to a common permeate outlet pipe. Feed flow is in series through the bundles and has a common annular flow passage only for each pair of bundles. The common central outlet pipe is segmented and there is no attachment means to each bundle. This multiple bundle arrangement is limited to radial flow configuration. The retentate from the first bundle becomes the feed for the next bundle in the series. The arrangement has a number of disadvantages. Each bundle is exposed to feed of a different composition and operates at different stage cut/recovery, and thus will produce permeate of different composition.

U.S. Pat. No. 4,652,373, issued Mar. 24, 1987 to J. L. Trimmer, discloses a wound hollow fiber permeator for producing processed water based on an improved tube sheet which is drilled with a hole pattern that cuts through all the hollow fibers to minimize losses caused by the presence of uncut fibers. The module's shell contains two bundles that operate in essentially radial flow configuration with permeate and retentate collected from a concentric tube arrangement.

U.S. Pat. No. 4,670,145, issued June 2, 1987 to D. W. Edwards, discloses a hollow fiber permeator containing a plurality of bundles and a tubular assembly that comprises a central outer tube the interior of which communicates with a first port at one end of the permeator casing and the exterior of said central outer tube, and an inner tube attached to and located within said central outer tube, said inner tube in communication with a second port at the end of the permeator casing opposite the first part. The bundles have an end mounted in an annular tubesheet and communicate with an annular chamber, this assembly removably mounted on said central outer tube. Means are also required for communication between each of said annular chambers with said inner tube. In addition the permeator contains a third port in the casing which is in communication with the exterior of said bundle assemblies. The bundles operate essentially in radial flow configuration.

Japanese Patent Application Sho 63-291605 published Nov. 29, 1988 discloses an apparatus for treating contaminated water. The invention provides means for providing an air back-flash or air scrubbing to remove suspended matter accumulated on the outside surface of the large diameter hollow fibers. The hollow fibers are arranged in a parallel configuration with filtrate collector tubes distributed throughout the hollow fiber bundle.

THE DRAWINGS

FIGS. 1B to 1E are more detailed schematic views showing variations of FIG. 1A and illustrating exemplary constructions for different fluids flow patterns in the multiple bundle module 23.

The multiple bundle fluids separation apparatus illustrated in FIGS. 1A through 1E is shown as comprised of bundles produced by helical winding of hollow fibers with bore openings created by severing the potted cartridge end at an oblique plane, as described in U.S. Pat. No. 4,865,736. It is, however, understood that the apparatus of the present invention is not limited to the use of helically wound cartridges only, and other cartridge designs can be advantageously utilized as well. The use of cartridges manufactured by severing the hollow fibers perpendicular to the potted bundle end rather than at the oblique plane require some modifications in the fluids separation apparatus shown in FIGS. 1A through 1E. Namely, porous support plates (or other means well known in the art) have to be used for proper cartridge support and distribution of permeate fluid into the auxiliary permeate tubes and terminal permeate exit port. Modifications in adjacent bundle tubesheet interfaces can be easily made to accommodate bundles with potted ends that are severed in a flat plane rather than at oblique angles as can be appreciated by those skilled in the art.

BRIEF SUMMARY OF THE INVENTION

This invention pertains to a fluids separation apparatus that contains multiple hollow fiber bundles The apparatus contains at least two hollow fiber membrane bundles arranged in linear series, all encased in a shell or casing. Each hollow fiber membrane bundle contains semipermeable hollow fiber membranes of selective fluid permeability embedded in a tubesheet at one end and an end cap at the opposite end of the bundle. Extending generally in parallel direction to the shell and hollow fiber membrane bundle is a core tube having fluid flow means (10) (openings or holes). FIG. 1A shows the core tube (6) positioned within the bundles (1). The central core tube of a bundle is generally connected to the central core tube of any bundle adjacent thereto by tube connector means; examples of connector means are shown in FIGS. 1A, 1B, 1C and 1D, but other connector means can also be employed. The hollow fiber membrane bundles are connected to one another by tube connector means 7 shown in enlarged drawing FIG. 4. The tubesheets and end caps are encased within cylindrical casing means 26 also shown in FIG. 4. The casing means contains an internal channel to convey permeate fluid between the hollow fiber openings and the connecting permeate tube which is generally situated externally to the bundle and which also serves to serially secure hollow fiber bundles to each other and to convey fluid exiting the hollow fiber openings for recovery outside the shell. One terminal bundle of the module generally connects at the tubesheet end to a first module end seal and the second opposite terminal bundle of the module generally connects at the end cap end to a second module end seal. The module contains means for inlet of the feed stream and for exit of permeate and retentate streams.

The invention further provides a removable easy-to-install assembly. Advantageously, the bundle-to-bundle connections can be made outside of the pressure shell. The connected bundles can thus be inserted into, and also removed from, the pressure shell as a single unit. Aligning and sealing of the bundles one by one internally in a long pressure shell can be extremely difficult because connections have to be made blindly and cannot be easily checked for proper sealing. The present invention avoids problems frequently associated with assembling a multiple bundle configuration into a pressure shell.

DESCRIPTION OF THE INVENTION

The use of hollow fiber membrane bundles to separate a first component from at least one other component in a fluids mixture is well known. To accomplish this different configurations have been disclosed and, in general, all require encasement of the bundle in a shell or casing, generally a pressure casing, to facilitate introduction of feed and recovery of permeate and retentate.

This invention pertains to a fluid separation apparatus in which a multiplicity of hollow fiber bundles is contained within a longitudinal length of cylindrical casing. There are several advantages in using several hollow fiber bundles within one outer-pressure longitudinal cylindrical casing; e.g., piping, valving and shell costs are reduced if a smaller number of larger cylindrical shells are used and installation and spacial requirements can be met under certain circumstances.

However, the use of a single long bundle in a large, longitudinal casing may result in excessive and undesired hollow fiber bore-side pressure drop. Similarly such a construction may also suffer high shell-side pressure drop due to a high feed flow rate. When countercurrent or cocurrent flow configurations are employed, this invention allows for the stacking of a plurality of relatively short bundles within one relatively long pressure shell. This invention also provides for the distribution of the feed flow among the bundles within the longitudinal cylindrical pressure casing so that shell-side pressure drop is minimized and all bundles within the single long casing operate at essentially the same stage cut, thus producing permeate and retentate fluid streams of essentially the same composition and at essentially the same pressure. Stage cut is defined as the ratio of permeate flow to feed flow. The multiple bundle apparatus of this invention can be constructed to provide countercurrent, cocurrent or radial flow configurations of the fluid streams in the bundles and can be tailored to specific operations and requirements for optimal separation of the fluid mixture involved.

This invention is a multiple bundle hollow fiber membrane apparatus for separating one component of a fluid mixture from a second component of a fluid feed mixture. By the term multiple bundle hollow fiber apparatus, or variant thereof, is meant a module or apparatus containing at least two hollow fiber bundles arranged in linear series and encased in a longitudinal casing or shell as hereinafter more fully described. The number of bundles in the shell can vary from two to about ten or more and is dependent upon the sizes of the individual bundles, the size of the longitudinal shell and the specific needs and requirements of the separation, as well as the process parameters involved. As a result of the present invention an improved fluid separation apparatus has been found that serves to eliminate or alleviate some of the drawbacks previously encountered by the use of previous existing assemblies.

A number of hollow fiber membrane bundle designs can be useful in the multibundle module design of this invention.

Radial flow design can be an advantageous flow configuration in reverse osmosis and some gas separation applications. Radial flow hollow fiber bundles are produced by arranging hollow fibers in a uniform manner around a perforated pipe as, for example, described in U.S. Pat. Nos. 3,755,034 and 3,690,465. The fibers are typically arranged around the perforated pipe in a linear parallel configuration or by helical winding, braiding, twisting, or other techniques well known in the art. Both ends of the bundle are incorporated into tubesheets while only one end is typically severed to expose hollow fiber bores.

Figure 1:
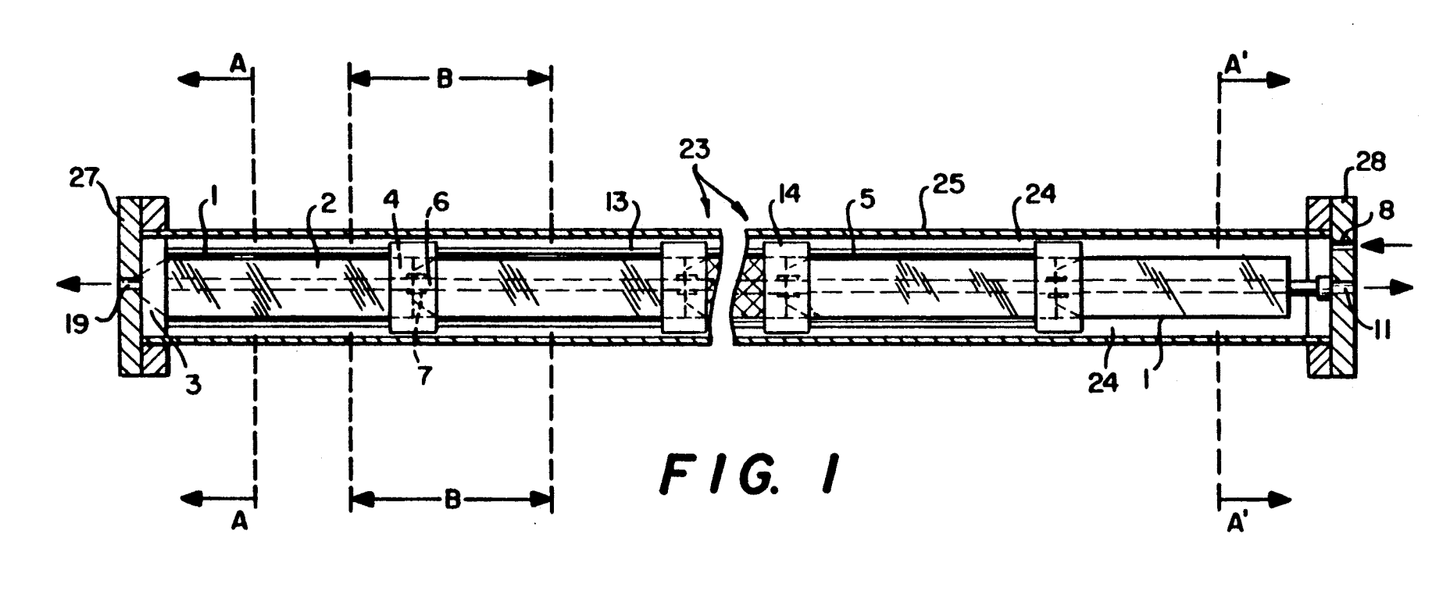
FIG. 1 shows connector means of the instant invention generic to FIGS. 1A–1E.
Figure 1A:
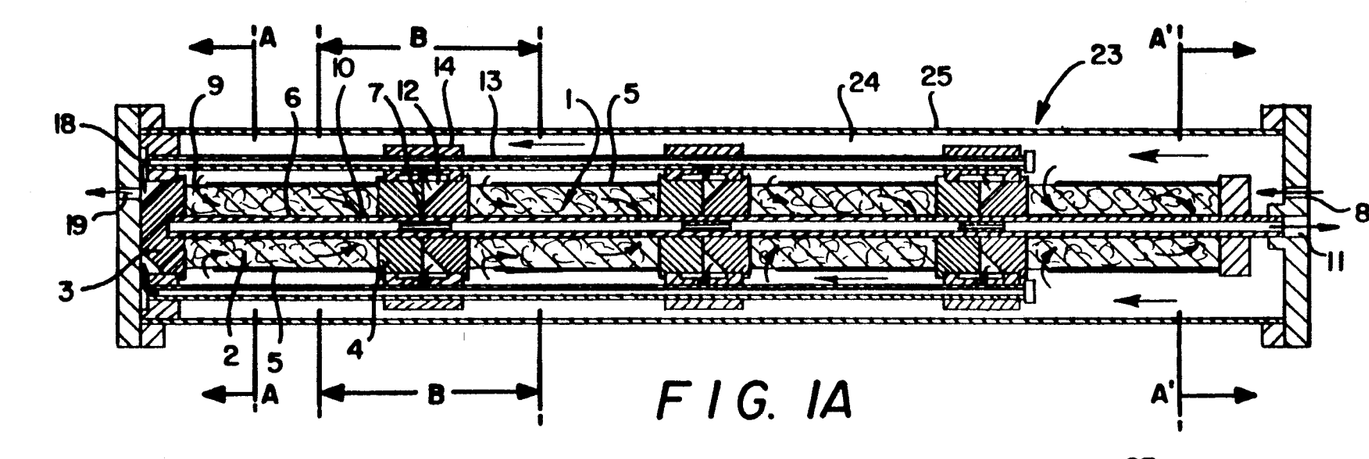
FIG. 1A is a general schematic sectional view of an embodiment of the multiple bundle fluids separation apparatus of this invention wherein hollow fiber membrane bundles are linearly and serially contained in a shell for use where a countercurrent fluids flow and central core tube retentate removal procedure are employed during the separation process.

A typical hollow fiber bundle for radial flow fluid configuration that can be utilized in the multiple bundle fluid separation apparatus of this invention is described in U.S. Pat. No. 4,061,574. The bundle, as described in this patent, is prepared by arranging parallel hollow fibers in generally cylindrical fashion around an axial core pipe, which is hollow except for a cemented-on solid end portion. Slots or holes in the walls of the hollow portion of the core constitute a means for removal of the nonpermeate fluid from the exterior of the hollow fibers. In an alternative embodiment, slots can be used to introduce the feed fluid. The ends of the bundle are incorporated in a tubesheet and an end cap. An adaptor threaded onto the core can be connected to retentate or nonpermeate removal conduits or alternatively to feed fluid source when the bundle is placed in the appropriate casing assembly, as shown in FIG. 1D. Note, however, that the flow configuration shown in FIG. 1D is countercurrent rather than radial. Spaced-apart rows of bores which are parallel to each other and to the face pass completely through a tubesheet section having peripheral surface into which bores open. The annular groove in the large diameter section of the tubesheet and in the end cap is intended to receive an elastomeric O-ring seal. The hollow fiber bores can be opened by cutting slots rather than drilling bores. In an alternative configuration, the bottom of the tubesheet can be severed flat to expose hollow fiber bores and the tubesheet supported by an appropriate flow distributor plate. Other hollow fiber bundle configurations of radial flow design are known in the art and can be used in the separation apparatus of the present invention, for example, the design described in European patent Application No. 0201320A3 filed May 7, 1986. A plurality of bundles, manufactured as described above, can be installed into the apparatus shown in FIG. 1D, and the permeate and nonpermeate flows collected through the system of auxiliary pipes external to the bundles. The bundles shown in the references can be modified by extending the axial hollow pipe through the tubesheet to provide for a continuous fluid pathway throughout the bundle except for one terminal bundle as shown in FIG. 1A. Bundles of this design can be installed into the apparatus as shown in FIG. 1C to provide a multiple bundle separation apparatus of radial flow configuration of this invention. Design of the multiple bundle apparatus shown in FIG. 1C requires continuous connection of core tubes within the bundles except for the core tube of the terminal bundle. However, the terminal bundle can also be equipped with this type of connection to provide for an additional exit port for retentate gas if desired.

For gas separation applications, the countercurrent or cocurrent flow configuration is frequently a most desirable flow arrangement. The multiple bundle separation apparatus of the present invention can be advantageously utilized in these flow configurations employing hollow fiber bundles such as those describe in U.S. Pat. No. 4,865,736 issued Sept. 12, 1989 to M. Coplan. The design of a bundle useful for cocurrent flow configuration is a modification of the drawing of this patent. In short, the hollow fiber package body is arranged in cylindrical shape around a core pipe and potted at both ends. The core pipe is perforated at one end close to the tubesheet to provide for alternative exit or entry of the fluid mixture. The outer surface of the hollow fiber bundle is covered by a film nonpermeable to the fluid, except for an uncovered region near the end cap and opposite to the end that contains perforations in the core pipe. The uncovered region allows for the entry or the exit of the fluid mixture. Modification of the structure shown in the drawing of U.S. Pat. No. 4,865,736 provides a hollow fiber bundle for separation of fluid mixtures in countercurrent or cocurrent flow arrangements. An annular shaped hollow fiber bundle is formed by winding individual hollow fibers in a helical pattern around a hollow support pipe (mandrel). The pipe is perforated typically with at least one row of holes, at least two holes in the row close to the bundle cap end to provide for an exit or entry passage for the nonpermeate fluid or feed fluid mixture. The hollow fiber bundle is encased by an outer wrap or impermeable barrier, except for the uncovered region, which may be a wrap of an impervious film that closely adheres to the external cylindrical surface of the bundle. The barrier covers the outer surface of the hollow fiber package body except for an uncovered region at the pot end area to allow for the introduction or exit of fluid mixture. Both ends of the bundle are potted, the tubesheet end and the cap end. Fiber bore openings are created by severing one end at an oblique plane. The bundle shown in the drawing of U.S. Pat. No. 4,865,736 is further modified in that the center core hollow mandrel extends through both potted ends, the tubesheet and end cap, as shown in FIG. 1A of this specification except for one terminal bundle. The bundles of this design can be installed into the modules as shown in FIG. 1A with O-rings (16) (shown in enlarged FIG. 2) providing a leak-tight seal between feed, permeate and nonpermeate streams. The double-headed arrows in the drawing of U.S. Pat. No. 4,865,736 signify alternative possible directions of flow such that the gap at the end of the barrier is the feed fluid inlet and holes in the mandrel are the nonpermeate exit, and vice versa, for the countercurrent and the cocurrent flow arrangements, respectively. In the multibundle module arrangement of this invention the reversal of flow will interchange the feed and retentate entry and exit ports. The position of the holes and the membrane uncovered region can be essentially reversed with holes placed in the mandrel close to the pot end rather than next to the cap end and membrane uncovered region in the impermeable barrier is placed next to the cap end rather than the potted end. This alternative configuration will also provide for good countercurrent or cocurrent flow arrangements.

FIG. 1A is illustrative of an embodiment of the fluid separation apparatus of this invention. The use of this apparatus to separate a mixture of gases, for example hydrogen from methane, involves feeding the fluids through entrance port (8) of multiple bundle apparatus or module (23). The fluid feed flows along the annulus (24) between the shell (25) and bundles (1) into the uncovered regions (9) of FIG. 1A, shown in enlarged drawing FIG. 2, and through the exterior of the hollow fiber membranes (2) encased in outer wrap (5) of bundles (1). Depending upon the feed flow configuration into the apparatus, bundle entrance region (9) may represent the bundle exit region (9). Hollow fiber bundles (1) comprise hollow fiber membranes (2), tubesheet (3), end cap (4) and, optionally for countercurrent flow an impervious outer wrap (5), components (2), (3), (4) and (5) being shown in larger detail in enlarged drawing FIG. 2. The gas that has not permeated the hollow fiber membranes (2) of bundles (1) exits through fluid flow means (10), shown in enlarged drawing FIG. 3, into central core tube (6). Central core tube (6) can also serve to connect hollow fiber bundles (1) to one another by means of tube connector (7), shown in enlarged drawings FIGS. 3 and 4. The retentate gas flowing in central core tube (6) of each bundle (1) joins the retentate gases from the other bundles (1) and exits from multiple bundle apparatus (23) at retentate fluid outlet port (11). The permeate gas exits at the hollow fiber openings (12), shown in enlarged drawings FIGS. 2, 3 and 4, from each bundle (1) and flows into the connecting auxiliary permeate tubes (13) via permeate holes (20) shown in FIG. 3. A cylindrical casing (14) between the bundles (1) is provided with an internal channel (15), shown in enlarged FIG. 3, for the permeate gas to flow into the connecting permeate auxiliary tubes (13). A seal between the permeate and feed sides across the tubesheets (3) is provided by O-rings (16) and O-rings (17), shown in enlarged FIG. 3, and provides a fluid-tight seal against the permeate tubes (13). All of the permeate streams are joined at the terminal permeate-collection channel (18), shown in enlarged FIG. 2, and exit the multiple bundle module (23) at permeate fluid outlet port (19). The permeate collection channel (18) that surrounds the tubesheets is so arranged as to provide continuous communication between the hollow fiber openings and the permeate exit port. The permeate collection channel further serves as a conduit for permeate collection from auxiliary permeate tubes (13) into the permeate exit port. The multiple bundle apparatus (23) is sealed at opposite ends with a first module end seal (27) and a second module end seal (28). The end seals (27) and (28) are secured to the shell (25) by bolts or other suitable means.

The feed flow into the shell or casing (25) can be introduced at any point on the shell and in the specific embodiments shown in the figures it is introduced as shown. When discussing radial cocurrent or countercurrent fluid flow in regard to the drawings, the manner of flow referred to is the flow of the fluids in the bores of the hollow fibers relative to the flow of the fluids in the exterior of the hollow fiber membranes (2) encased in outer wrap (5) of bundle (1). The direction of flow of feed in the casing assembly before it enters the bundle (1) is not relevant when discussing cocurrent or countercurrent flow. What is relevant in these instances is the relation of flows inside the bundle (1). These comments are to be kept in mind when considering the discussions of the drawings. The fluid flow means (10) can be perforations or any openings in the tube and serve for removal of retentate or introduction of feed depending upon the fluid feed direction. Further, when radial flow occurs the fluid flow means (10) may be positioned along the entire length of the tube within the bundle and when cocurrent or countercurrent flow occurs, the fluid flow means (10) are positioned in selected sections of the tube, as shown in the drawings.

FIG. 1A illustrates a construction of the multiple bundle fluid separation apparatus (23) of this invention for a countercurrent fluid flow arrangement. The arrows show the flow directions of the fluid components in the different areas of the apparatus. All numbered designations in FIGS. 1B to 1E correspond to those discussed in FIGS. 1A and 2. As shown by the arrows the feed fluid flows in the annulus (24) in the direction from right-to-left and the retentate flows in the bundles (1) and central core tube (6) in the direction from left-to-right; flow of feed fluid into the apparatus through entrance port (8) and the annulus (24) are in the same direction. The feed enters bundles (1) via uncovered regions (9) and the retentate exists bundles (1) and enters central core tube (6) via fluid flow means (10). The retentate flows through central core tube (6) and exits through retentate fluid outlet port (11) and the permeate exits through permeate fluid outlet port (19).

Figure 1B:
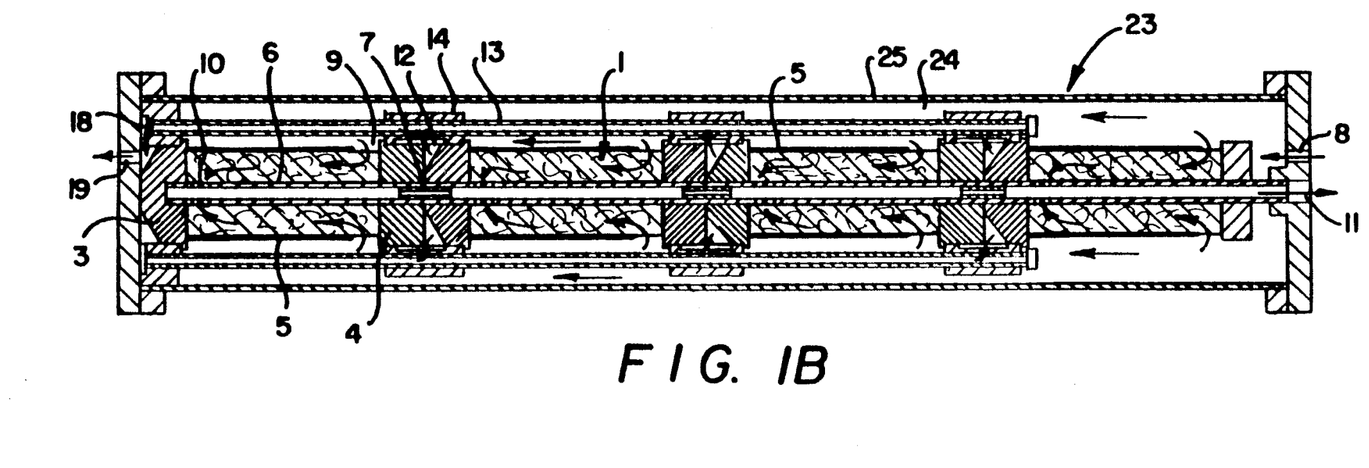
FIG. 1B is illustrative of a schematic view of a multiple bundle apparatus typical for use where a cocurrent fluids flow and central core tube retentate removal procedure are employed during the separation process.
Figure 1C:
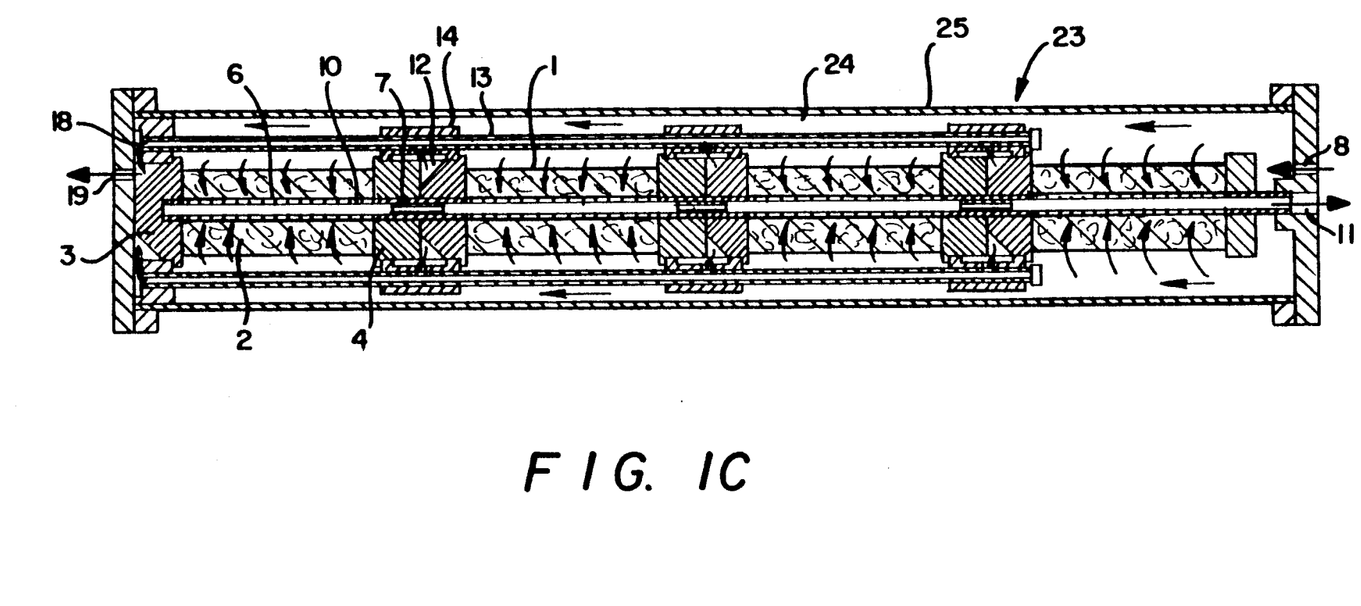
FIG. 1C is illustrative of a schematic view of a multiple bundle apparatus typical for use where a radial fluids flow and central core tube retentate removal procedure are employed during the separation process.
Figure 1D:
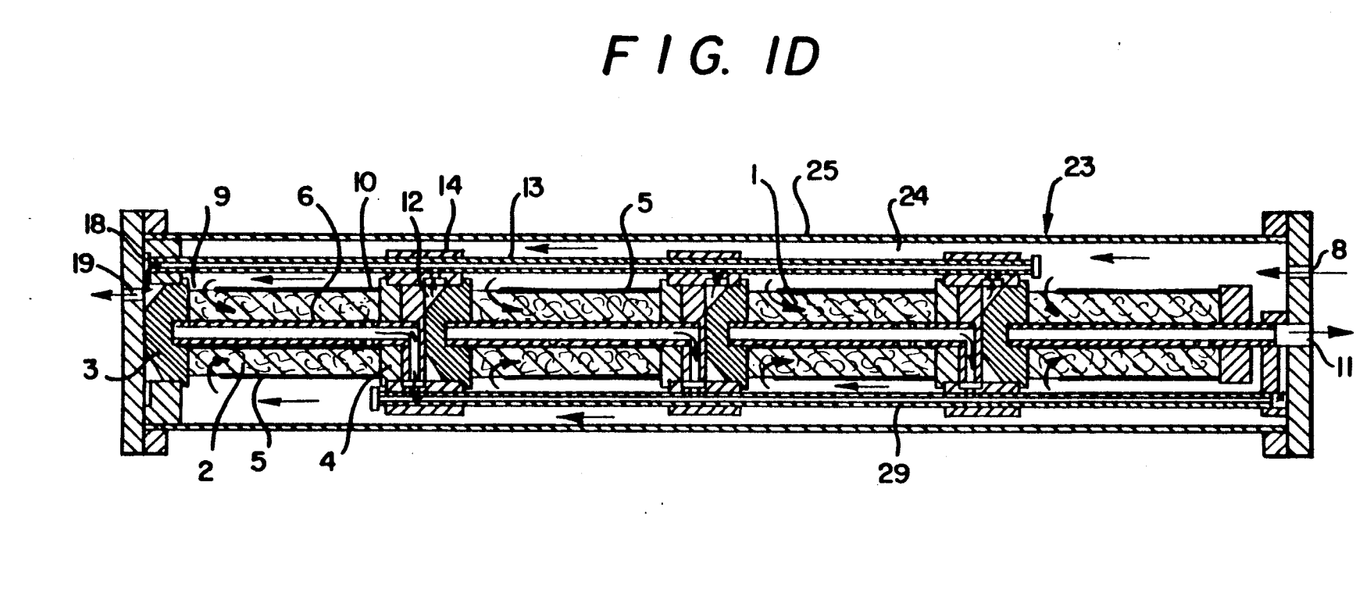
FIG. 1D is illustrative of a schematic view of a multiple bundle apparatus typical for use where a countercurrent fluids flow and outer tube retentate removal procedure are employed during the separation process.

FIG. 1B illustrates a construction of the multiple bundle fluid separation apparatus (23) of this invention for a cocurrent fluid flow arrangement and central core tube (6) retentate removal through retentate fluid outlet port (11). In this construction, the position of the bundle uncovered region (9) is such that there is a cocurrent flow of feed fluid across the exterior surfaces of hollow fibers (2) of bundles (1) relative to the flow of fluid in the hollow fiber bores. In this embodiment the fluid flow means (10) in central core tube (6) are located adjacent to tubesheet (3) and bundle uncovered region (9) is located adjacent to end cap (4).

FIG. 1C illustrates a construction of the multiple bundle fluid separation apparatus (23) of this invention for a radial flow arrangement and central core tube (6) retentate removal through retentate fluid outlet port (11). The construction is similar to that of FIG. 1A except that the central core tube (6) is perforated throughout essentially its entire length with fluid flow means (10) and the impervious outer wrap (5) shown in FIG. 1A is not employed. The feed fluid flows uniformly about the exterior volume of hollow fiber membranes (2) of bundles (1) and along the entire length of bundles (1). It should be noted that the feed and retentate flow directions shown in FIG. 1C can be reversed and still provide a radial flow configuration.

FIG. 1D illustrates a construction of the multiple bundle fluid separation apparatus (23) of this invention for a countercurrent flow arrangement of fluids in the exterior of the hollow fiber membranes (2) of bundles (1) relative to the flow in the bores of the hollow fibers and operates with outer tube (29) retentate removal through retentate fluid outlet port (11). The construction differs from that of FIGS. 1A, 1B, 1C and 1E in that there is no continuous central core tube (6) through the entire length of all the bundles (1), rather, the tube (29) is outside the bundles (1) as shown in FIG. 1D. The retentate from each bundle (1) flows in the direction indicated by the arrows.

Figure 1E:
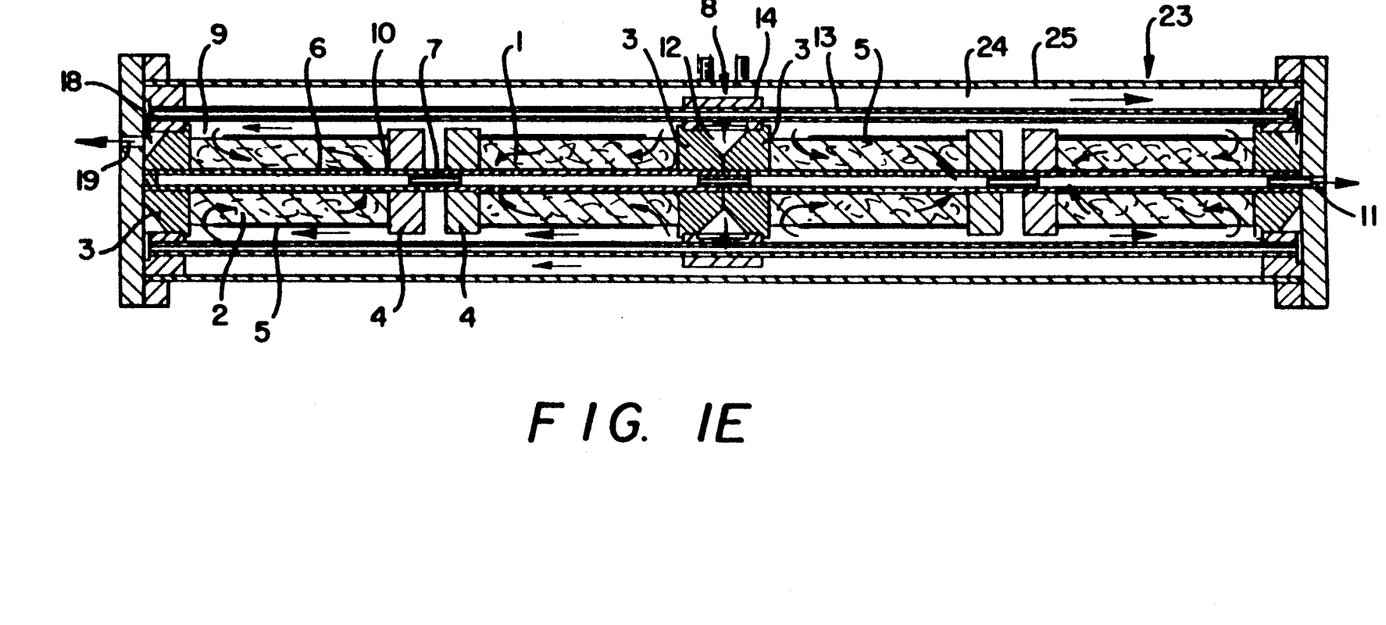
FIG. 1E is illustrative of a schematic view of a multiple bundle apparatus typical for use where a countercurrent fluids flow and central core tube retentate removal procedure are employed during the separation process. This construction differs from that shown in FIG. 1A in that the two inner bundles are tubesheet-to-tubesheet configuration rather than the tubesheet-to-end cap configuration shown in FIG. 1A. Similar tubesheet-to-tubesheet configurations can be constructed corresponding to FIGS. 1B, 1C and 1D.

FIG. 1E is illustrative of a construction of the multiple bundle fluid separation apparatus (23) of this invention for a countercurrent flow arrangement of fluids in the exterior of the hollow fiber membranes of bundles (1) relative to the flow in the bores of the hollow fibers and operates with central core tube (6) retentate removal through fluid removal outlet port (11) and a tubesheet (3) -to-tubesheet (3) and end cap (4) -to-end cap (4) configuration of the bundles (1) in the shell (25).

Figure 2:
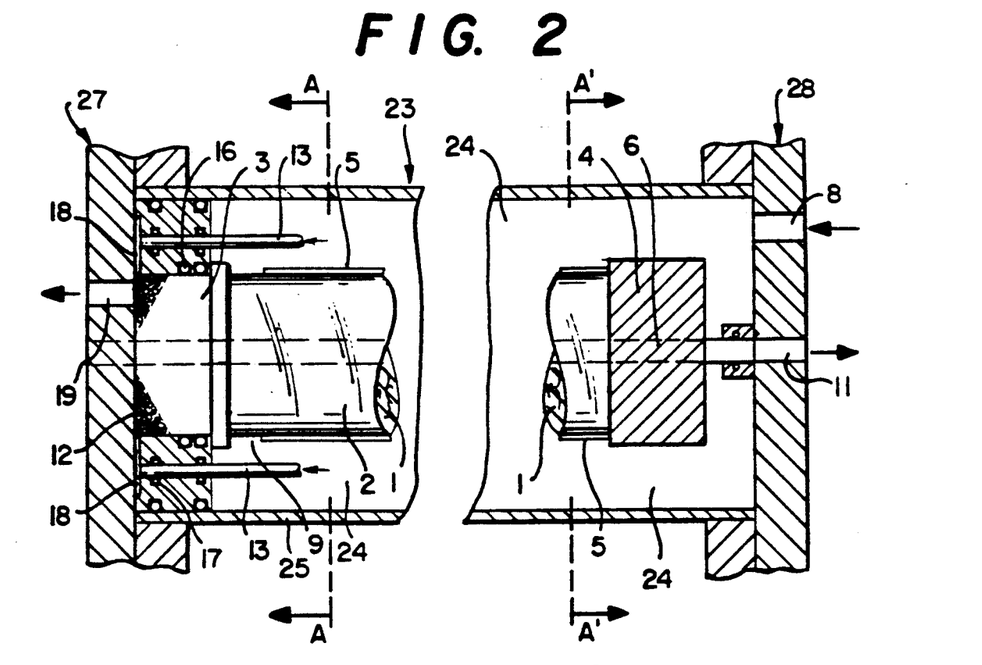
FIG. 2 is an enlarged schematic view of the two terminal ends of the multiple bundle fluids separation apparatus along the lines A—A and A'—A' of FIG. 1A, presented to more clearly illustrate general details of the multiple bundle module.

FIG. 2, an enlarged drawing of the two opposite ends of multiple bundle apparatus (23) along the lines A—A and A'—A' of FIG. 1A, presents more clearly the details of the ends of one form of multiple bundle apparatus (23). The module can be used to separate hydrogen from methane. The feed gas enters through entrance port (8), flows along annulus (24) between shell (25) and bundles (1) into bundle entrance region (9) of each bundle (1) and through the exterior of the hollow fibers of the bundles (1), each bundle (1) comprising hollow fiber membranes (2), tubesheet (3), end caps (4) and, optionally, outer wrap (5) when longitudinal flow is employed. The gas that has not permeated the hollow fiber membranes (2) of bundles (1) exits through fluid flow means (10), shown in enlarged drawing FIG. 3, into central core tube (6) of each bundle (1) joining the retentate gases from other bundles (1) and exits from multiple bundle apparatus (23) at retentate fluid outlet port (11). The permeate gas exits at the hollow fiber openings (12), shown in enlarged FIGS. 3 and 4, from each bundle (1) and flows into the connecting permeate auxiliary tubes (13). A cylindrical casing (14) (not shown in FIG. 2) between the bundles (1) is provided with an internal channel (15), shown in enlarged FIG. 3, for the permeate gas to flow into the connecting permeate auxiliary tubes (13). A seal between the permeate and feed sides of the tubesheet (3) is provided by O-rings (16) and O-rings (17) to provide a fluid-tight seal against the connecting permeate auxiliary tube (13). All permeate streams are joined at terminal permeate-collection channel (18) and exit multiple bundle apparatus (23) at permeate fluid outlet port (19).

Figure 3:
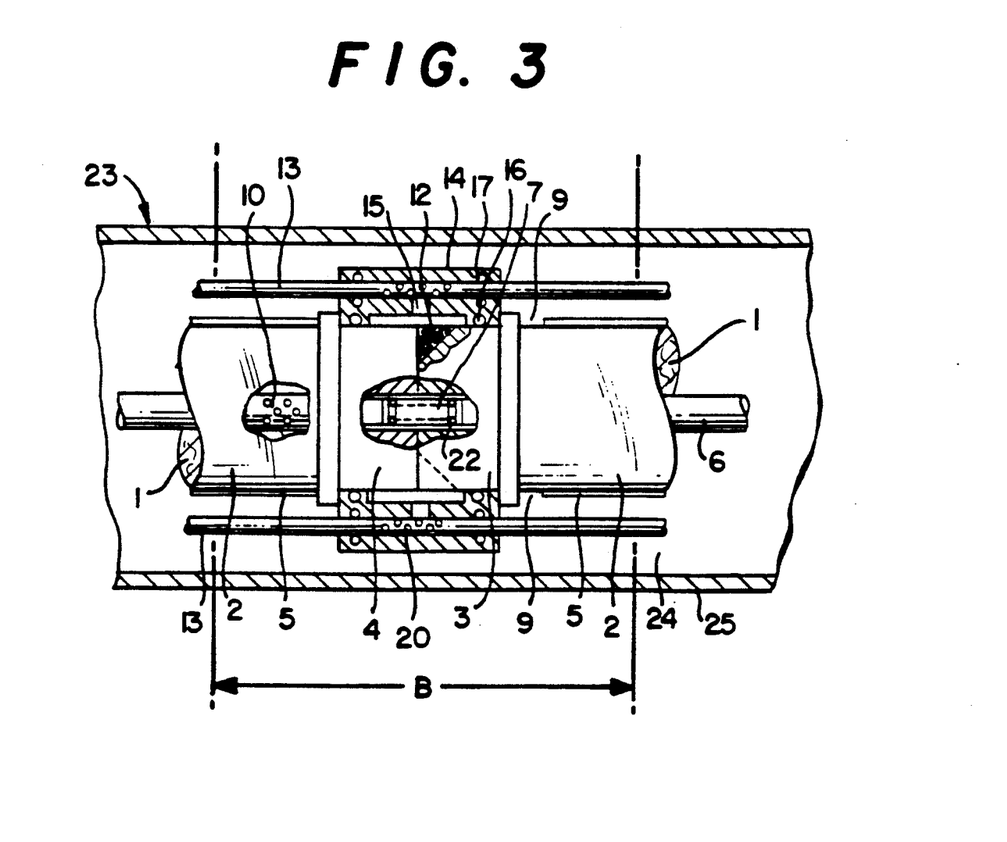
FIG. 3 is an enlarged schematic view of the area designated by the letter ←B→ in FIG. 1A, presented to more clearly illustrate general details of the area at which two bundles are joined and general details of other means within the module.

FIG. 3 is an enlarged drawing showing details of the area of the multiple bundle apparatus (23) designated by the letter ←B→ in FIG. 1A, presented to more clearly illustrate details of central core tube (6), tube connector (7), fluid flow means (10), connecting permeate auxiliary tube (13), cylindrical casing (14), internal channel (15), O-rings (16) and (17), and permeate holes (20), with all numbered designations corresponding to those previously discussed for FIGS. 1 and 2.

Figure 4:
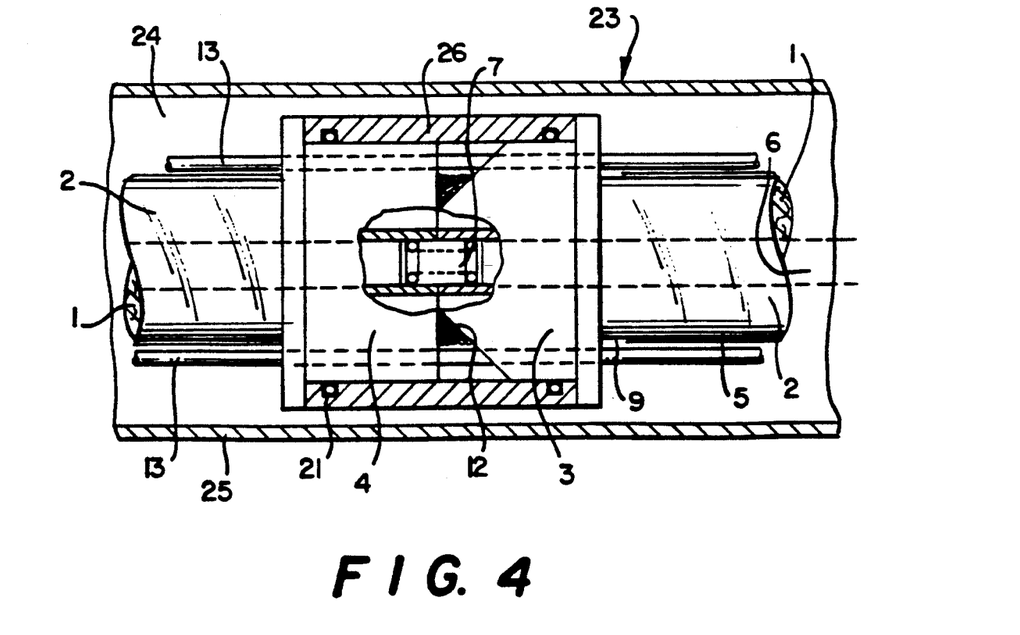
FIG. 4 is a schematic view of an alternate embodiment to that shown in FIG. 3.

FIG. 4 is an alternate embodiment of the construction shown in FIG. 2. In this embodiment connecting permeate tubes (13) are sealed in the tubesheets (3) and end caps (4) of bundles (1). A cylindrical casing (26) forms a fluid-tight seal between the permeate and feed sides of the hollow fiber bundles (1) by means of O-rings (21).

Figure 5:
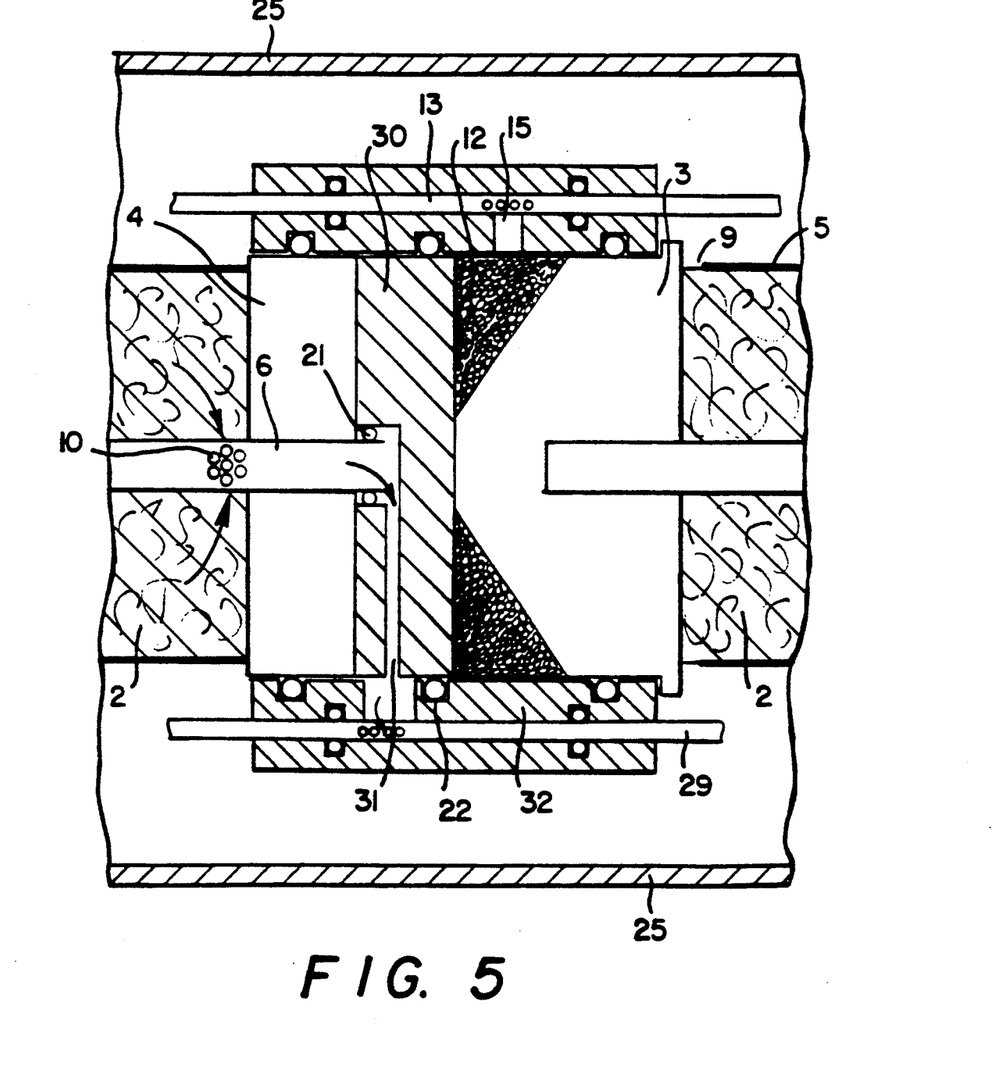
FIG. 5 is an enlarged schematic view of the tubesheet and end cap interfaces of adjacent bundles in FIG 1D, presented to more clearly illustrate general details of this bundle-to-bundle interface.

FIG. 5 is an enlarged drawing showing details of the bundle(2)-to-bundle(2) interface of FIG. 1D. A conduit (31) in the support plate (30) directs the retentate fluid into the outer tube (29). The central core tube (6) seals into the conduit (31) by means of O-rings (21). O-rings (22) seal support plate (30) to collar (32). Support plate (30) also acts as support for tubesheet (3).

Figure 6A:
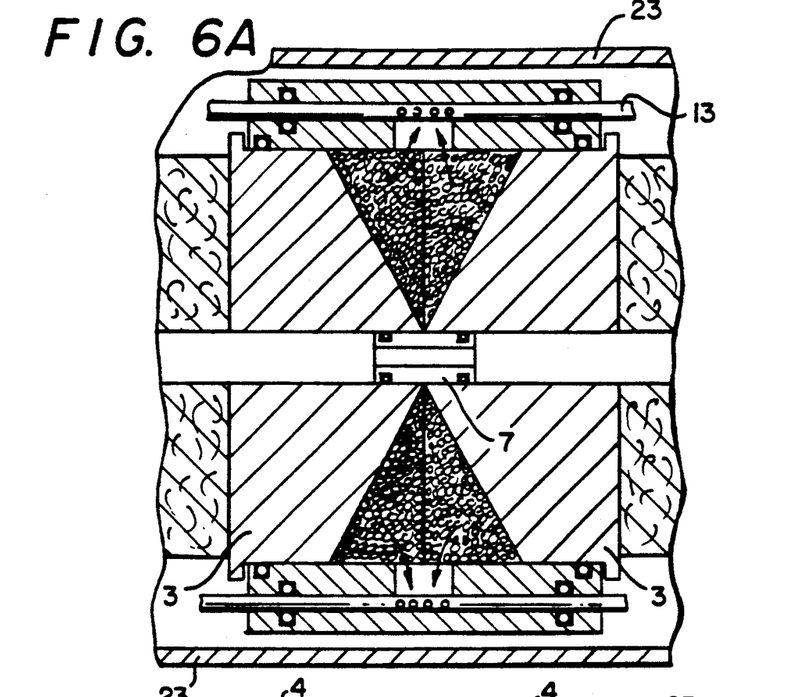
FIG. 6A and FIG. 6B are enlarged drawings of the arrangements shown in FIG. 1E showing bundle-to-bundle connections made by a tubesheet-to-tubesheet configuration and an end cap-to-end cap configuration.
Figure 6B:
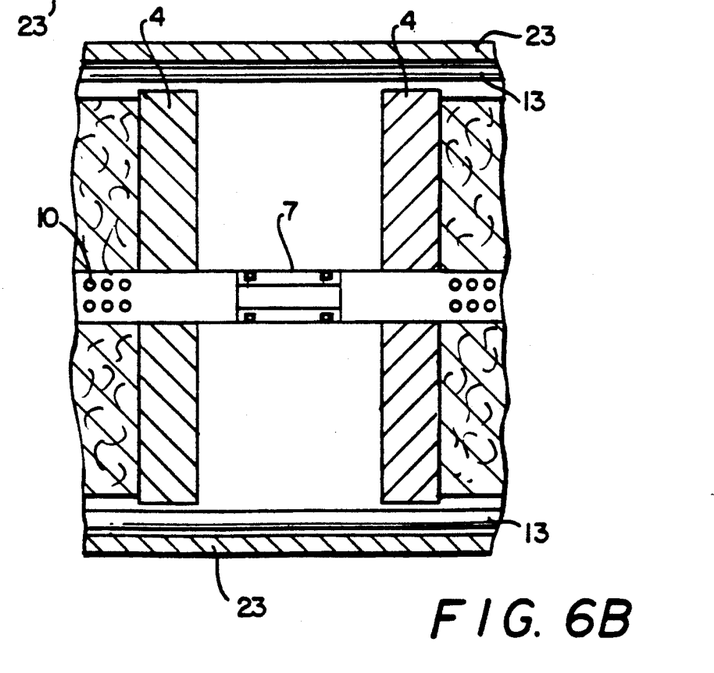

FIGS. 6A and 6B show in detail the bundle-to-bundle connections of FIG. 1E. The connections are made by joining the tubesheets (3) to each other and the end caps (4) to each other, respectively.

Figure 7A:
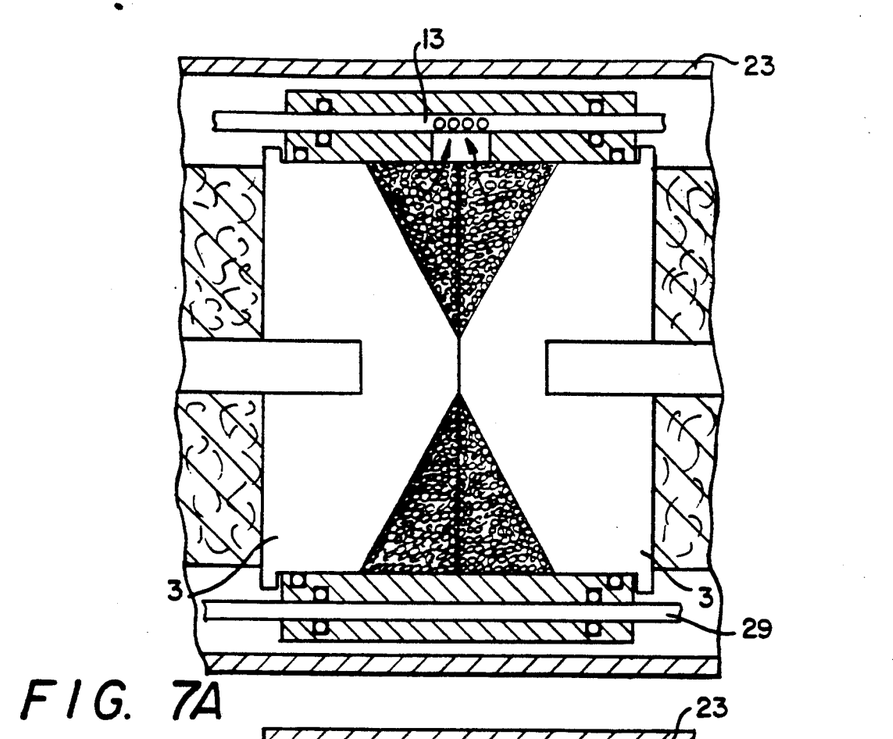
FIG. 7A and FIG. 7B are alternates to the arrangement shown in FIG. 1D showing bundle-to-bundle connections made by a tubesheet-to-tubesheet configuration and an end cap-to-end cap configuration.
Figure 7B:
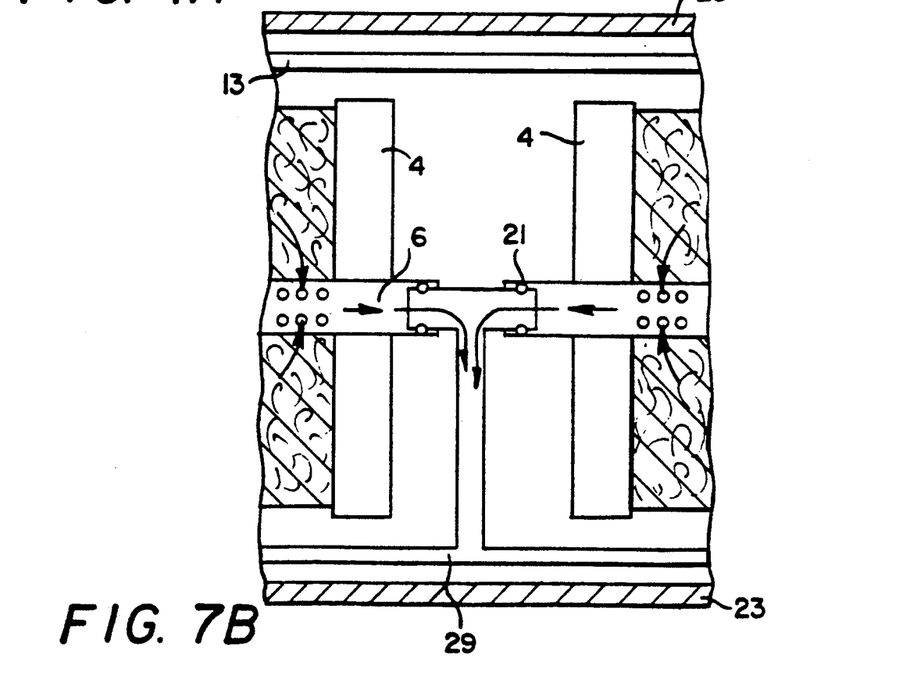

FIGS. 7A and 7B show alternate arrangements to that shown in FIG. 1D. The bundle-to-bundle connections can be made by joining the tubesheets (3) to each other and the end caps (4) to each other, respectively.

Though the connecting permeate auxiliary tubes (13) in FIG. 1A are shown on the outside of hollow fiber bundles (1), they may also be located within the hollow fiber bundle (1) itself. The preferred radial location of the connecting permeate auxiliary tubes (13) would be determined on the basis of ease of manufacture and placement of the bundles (1) into the shell (25).

The cylindrical casing means (14) may be of any shape desired, e.g., circular, eliptical, rectangular, square, etc.

The central core tube or rod (6) is the core for the hollow fiber bundle (1). The hollow fiber membranes (2) are arranged around the core either in longitudinal or spiral wound arrangement, preferably in helical wound arrangement, using established procedures known in the art.

Referring to the fluid separation apparatus shown in FIG. 1A, countercurrent flow of fluid is discussed below to separate hydrogen and methane from a mixture thereof. The fast gas permeating the hollow fibers will be hydrogen, thus hydrogen will be concentrated in the permeate while the non-permeate will be the slower permeating methane. The pressurized feed mixture enters the module (23) through entrance port (8). The feed gas then flows along the annulus (24) into the bundle uncovered regions (9), and an hydrogen-enriched component permeates through the hollow fiber membranes (2) of the bundles (1) into the bores of the hollow fibers. The methane-enriched retentate component remains on the exterior side of the hollow fiber membranes (2) and exits the bundles (1) through fluid flow means (10), into central core tube (6). The retentate methane-enriched gas flowing in the central extraction tube (6) of each bundle (1) joins with retentate gas from prior bundles (1) and the whole retentate finally exits multiple bundle module (23) at retentate fluid outlet port (11). The hydrogen-enriched permeate component of each bundle exits through hollow fiber openings (12) of each tubesheet (3) and enters connecting permeate auxiliary tube (13). A cylindrical casing (14) between adjacent bundles (1) is provided with an internal channel (15), shown in FIG. 3, for the enriched hydrogen gas to flow from the hollow fiber openings (12), into the connecting permeate auxiliary tube (13). O-rings (16), shown in FIG. 3, provide a fluid-tight seal between the permeate and feed sides along the tube sheets while O-rings (17), shown in FIG. 3, provide a fluid-tight seal against the connecting permeate auxiliary tube (13). All of the hydrogen-enriched permeate streams finally join together at the terminal permeate-collection channel (18), shown in FIG. 2, and exit the multiple bundle module (23) at permeate fluid outlet port (19). There are thus recovered two components, a first permeate hydrogen-enriched component from permeate fluid outlet port (19) and a second retentate methane-enriched component from retentate fluid outlet port (11).

The materials used to process the various components, e.g. the hollow fibers, membranes, tubesheet, end cap, wrap, core tube, shell, O-rings, permeate auxiliary tubes, casings, etc., are those conventionally used in this technological field and require no further description herein to enable one skilled in the art to assemble the multiple bundle hollow fiber apparatus of this invention. The number of hollow fiber membrane bundles arranged in linear series and encased in the longitudinal casing or shell in end-to-end relationship can vary from two to ten or more, preferably up to about 5. Due to the manner of construction and configuration pressure problems are considerably alleviated. Any of the known hollow fiber membranes can be used. The apparatus of this invention can be used to dehydrate gaseous mixtures, separate gaseous mixtures such as air, carbon monoxide/hydrogen, carbon dioxide/methane, hydrogen/methane, as well as other mixtures.

What is claimed is:

1. A multiple bundle fluid separation apparatus comprising:
   (a) a shell having the shape of an elongated cylinder closed at both ends with one or both closures having a removable member;
   (b) a removable bundle assembly within said shell comprising at least one auxiliary tubular means, the interior of which is in communication with a first port of said shell, said auxiliary tubular means arranged external to a plurality of annular hollow fiber bundles;
   (c) a plurality of hollow fiber bundles, each comprising an annular bundle of hollow fibers around a core pipe, said core pipe having a plurality of fluid flow means to provide a passageway for fluid flow, said hollow fiber bundles each having a first end mounted in a tubesheet with hollow fiber severed to provide for permeate exit and the second end of each of said bundles mounted in an end cap, said bundles removably mounted to provide continuous fluid flow through the interconnected central core pipes and the said interconnected core pipes in communication with a second port of said shell;
   (d) means for collecting permeate from hollow fiber tubesheets in communication with said auxiliary tubular means external to the annular hollow fiber bundles recited in (b) above; a third port in said shell in communication with the exterior of said plurality of hollow fiber bundles.

2. A multiple bundle fluid separation apparatus as claimed in claim 1 comprising:
   at least two hollow fiber bundles arranged in linear series and encased in a shell, each of said bundles comprising (i) hollow fiber membranes of selective permeability embedded in a tubesheet at one end and an end cap at the opposite end, and (ii) central core tube within said hollow fiber bundle, and said central core tube of a bundle connected to the central core tube of bundles adjacent thereto by tube connector means;
   said hollow fiber bundles connected end-to-end by cylindrical casing means with permeate fluid in connection with auxiliary permeate tubes, said communication provided by an internal channel in cylindrical casing means;
   said auxiliary permeate tubes being in communication with permeate fluid outlet means of said apparatus whereby permeate is removed and recovered;
   feed inlet means for introduction of feed into the apparatus;
   non-permeate exit means for removal and recovery of retentate.

3. A multiple bundle fluid separation apparatus as claimed in claim 2 wherein the fluid flow means of said central core tube are located between the tubesheet and the end cap of said hollow fiber bundle.

4. A multiple bundle fluid separation apparatus as claimed in claim 3, wherein the fluid flow means perforations are along essentially the entire length of said central core tube.

5. A multiple bundle fluid separation apparatus as claimed in claim 3, wherein the fluid flow means perforations are located essentially adjacent to the tubesheet end of the bundle and the bundle is encased in a fluid tight outer wrap except for an uncovered region located at the end cap end of the bundle.

6. A multiple bundle fluid separation apparatus as claimed in claim 3, wherein the fluid flow means perforations are located essentially adjacent to the end cap end of the bundle and the bundle is encased in a fluid tight outer wrap except for an uncovered region located at the tubesheet end of the bundle.

7. A multiple bundle fluid separation apparatus as claimed in claim 2 wherein said bundles are arranged in an end cap-to-end cap and tubesheet-to-tubesheet configuration.

8. A multiple bundle fluid separation apparatus as claimed in claim 2 wherein said bundles are arranged in an end cap-to-tubesheet configuration.

9. A multiple bundle fluid separation apparatus as claimed in claim 2 wherein the holes in said connecting auxiliary permeate tube are located within the area encompassed by said cylindrical casing means.

10. A multiple bundle fluid separation apparatus as claimed in claim 1 wherein said hollow fiber bundles are helically wound.

11. A multiple bundle fluid separation apparatus as claimed in claim 1 having more than two hollow fiber bundles.

12. A multiple bundle fluid separation apparatus as claimed in claim 1 containing at least one additional auxiliary tube external to the bundles in communication with the central core tube.

13. A multiple bundle fluid separation apparatus as claimed in claim 12 wherein said additional auxiliary tube provides for removal of retentate.

14. A multiple bundle fluid separation apparatus comprising:
  (a) a shell having the shape of an elongated cylinder closed at both ends with one or both closures having a removable member;
  (b) a removable bundle assembly within said shell comprising at least one auxiliary tubular means, the interior of which is in communication with a first port of said shell, said auxiliary tubular means arranged external to a plurality of annular hollow fiber bundles;
  (c) a plurality of hollow fiber bundles, each comprising an annular bundle of hollow fibers around a core pipe, said core pipe having a plurality of fluid flow means to provide a passageway for fluid flow, said hollow fiber bundles each having a first end mounted in a tubesheet with hollow fiber severed to provide for permeate exit and the second end of each of said bundles mounted in an end cap, said bundles removably mounted to provide continuous fluid flow through the interconnected central core pipes and the said interconnected core pipes in communication with a second port of said shell for removal of retentate;
  (d) means for collecting permeate from hollow fiber tubesheets in communication with said auxiliary tubular means external to the annular hollow fiber bundles recited in (b) above; a third port in said shell in communication with the exterior of said plurality of hollow fiber bundles for introduction of feed.

15. A multiple bundle fluid separation apparatus comprising:
  (a) a shell having the shape of an elongated cylinder closed at both ends with one or both closures having a removable member;
  (b) a removable bundle assembly within said shell comprising at least one auxiliary tubular means, the interior of which is in communication with a first port of said shell, said auxiliary tubular means arranged external to a plurality of annular hollow fiber bundles;
  (c) a plurality of hollow fiber bundles, each comprising an annular bundle of hollow fibers around a core pipe, said core pipe having a plurality of fluid flow means to provide a passageway for fluid flow, said hollow fiber bundles each having a first end mounted in a tubesheet with hollow fiber severed to provide for permeate exit and the second end of each of said bundles mounted in an end cap, said bundles removably mounted to provide continuous fluid flow through the interconnected central core pipes and the said interconnected core pipes in communication with a second port of said shell for introduction of feed;
  (d) means for collecting permeate from hollow fiber tubesheets in communication with said auxiliary tubular means external to the annular hollow fiber bundles recited in (b) above; a third port in said shell in communication with the exterior of said plurality of hollow fiber bundles for removal of retentate.

16. A multiple bundle fluid separation apparatus comprising:
  (a) a shell having the shape of an elongated cylinder closed at both ends with one or both closures having a removable member;
  (b) a removable bundle assembly within said shell comprising at least one auxiliary tubular means, the interior of which is in communication with a first port of said shell, said auxiliary tubular means arranged external to a plurality of annular hollow fiber bundles;
  (c) a plurality of hollow fiber bundles, each comprising an annular bundle of hollow fibers around a core pipe, said core pipe having a plurality of fluid flow means to provide a passageway for fluid flow, said hollow fiber bundles each having a first end mounted in a tubesheet with hollow fiber severed to provide for permeate exit and the second end of each of said bundles mounted in an end cap, said bundles removably mounted to provide continuous fluid flow through the interconnected central core pipes and the said interconnected core pipes in communication with a second port and a fourth port, each located at the opposite terminal ends of said shell;
  (d) means for collecting permeate from hollow fiber tubesheets in communication with said auxiliary tubular means external to the annular hollow fiber bundles recited in (b) above; a third port in said shell in communication with the exterior of said plurality of hollow fiber bundles.

* * * * *